May 5, 1942.   E. W. SMITH   2,281,809
FISH LURE
Filed April 15, 1939
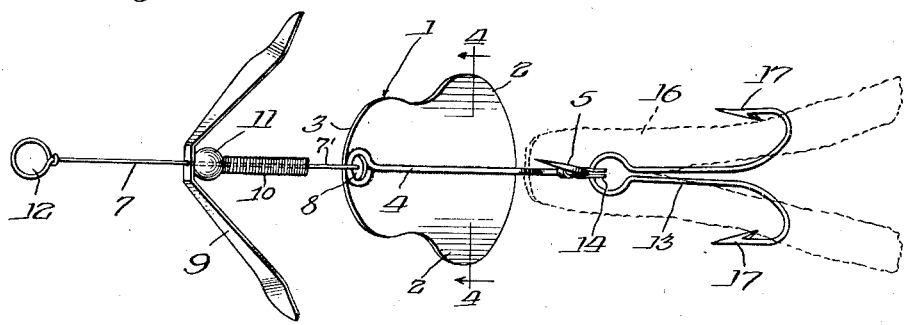
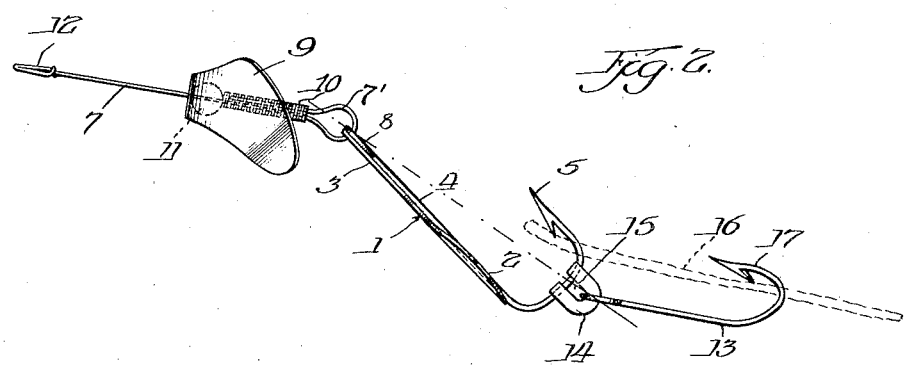
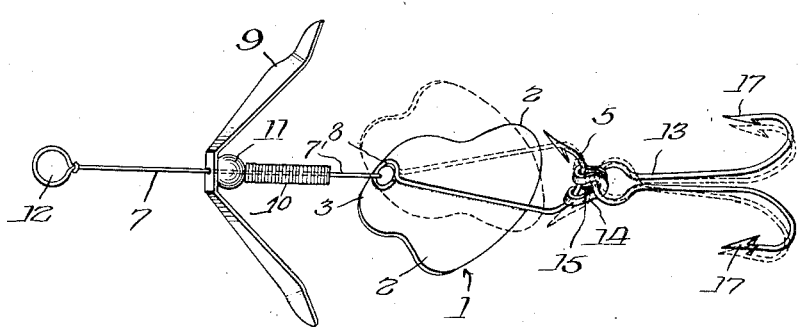
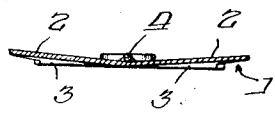
Inventor:
Earl W. Smith
By Hill & Hill Attys.

Patented May 5, 1942

2,281,809

UNITED STATES PATENT OFFICE 2,281,809

FISH LURE

Earl W. Smith, Chicago, Ill.

Application April 15, 1939, Serial No. 267,980

3 Claims. (Cl. 43—42)

The invention generally relates to fish lures, and more particularly to a spoon type of lure employing a spinner.

The invention has among its objects the construction of a lure to which the fish will be readily attracted and which, when drawn through the water, will simulate the swimming movements of a live bait.

Another object of the invention is the construction of such a lure in which the hooks are so positioned that the lure when drawn through the water will be substantially weedless, and in which the hooks are positioned to insure hooking of the fish on short strikes.

A further object of the invention is the construction of such a lure in which the spoon-shaped element will ride through the water at a decided longitudinal angle so that light will be reflected from the bottom of the spoon.

Many other objects and advantages of the invention herein shown and described will be obvious to those skilled in the art from the disclosure herein given.

To this end my invention consists in the novel construction, arrangement and combination of parts herein shown and described and more particularly pointed out in the appended claims.

In the drawing wherein like reference characters indicate like or corresponding parts:

Fig. 1 is a top plan view of the lure shown in a position similar to that when drawn through the water and with a pork rind or the like shown in dotted lines;

Fig. 2 is a side elevational view of the lure shown in Fig. 1;

Fig. 3 is a top plan view of the lure showing its movement in one direction and its movement in the opposite direction shown in dotted lines; and Fig. 4 is a sectional view taken on the line 4—4 of Fig. 1.

Referring to the drawing, 1 designates generally a plate or spoon member of a substantially pear shape, the rear or tail portion 2 being wider than the front or head portion 3. A hook 4 extends longitudinally along the top surface of the member 1 and is secured thereto by any suitable means such as solder as illustrated, with the barbed portion 5 of the hook extending upwardly. A metal leader 7 is provided, one end of which is bent to form a loop 7' which passes through an aperture 8 in the head end 3 of the plate. A wire sleeve 10 or other suitable means encircles the leader 7 and is engageable with the adjacent free end thereof for removably securing the latter to the remainder of the leader. Mounted on the leader 7 is a spinner 9, a bead 11 or the like acting as a bearing for the spinner, and at the extreme front end is provided with an eye 12 to which the line may be secured. A double hook 13 is attached to the hook 4 adjacent the barbed portion 5 by means of a clip member 14 or hinge as it is known in the trade, which is merely a thin sheet of material provided with an elongated opening 15, the sheet being bent back transversely upon itself as shown to form a substantially U-shaped clip which is engaged with the double hook after which it is slipped over the single hook to the position shown in Figs. 1 and 2.

It will be noted with reference to Figs. 2 and 4 that the front or head portion 3 of the spoon is substantially flat while the rear portion 2 is bent upwardly slightly as shown in Fig. 4 to provide a convex lower face.

A piece of pork rind, flannel or other suitable material is preferably used with the lure when fishing with the same and for illustrative purposes, a pork ring 16 is outlined in dotted lines in Figs. 1 and 2. The pork rind shown in Fig. 1 is cut in the form of a V, the hook 4 passing through the apex thereof and each barbed portion 17 of the double hook 13 passing through a leg of the V. However, if desired, two separate pieces of pork rind or other material may be used. When the lure is drawn through the water, it assumes substantially the position shown in Fig. 2, the body portion 1 being approximately at an angle of forty-five degrees. As the lure moves through the water, the spoon 1, due to its peculiar shape, rotates through a small arc about an axis passing through approximately the point of connection between the leader 7 and spoon 1 and the point of connection between the hook 4 and hook 13, the approximate extreme left-hand position of the spoon being shown in Fig. 3 and the approximate extreme right-hand position shown in dotted lines. It will be noted that this movement imparts a lateral movement to the rear portion of the spoon, as well as rotation of the spoon about a longitudinally extending axis. Also, as the spoon is positioned at a decided angle from the horizontal, light will be reflected from the bottom of the spoon and due to the longitudinal rotation thereof, it will be reflected over a relatively wide arc. As shown in Fig. 3, the wiggling movement of the spoon is also transmitted slightly to the double hook 13 and through the same to the pork rind extending therefrom.

From an examination of Figs. 1 and 2, it will be observed that the barbed portion 5 of the hook 4 is positioned below the front or head portion of the spoon 1. Consequently, there is substantially no danger of snagging the hook on weeds or the like. Similarly, the barbed portions 17 of the hook 13 are each positioned substantially on a line with the wide rear or tail portion 2 of the spoon 1 which likewise has a tendency to protect and shield the double hook, thereby preventing the same from being snagged. It might be mentioned that the spinner 9 also tends to deflect obstacles from the hooks so that the lure may be termed substantially weedless, this result being accomplished by the particular shape of the spoon and its position in the water, and without the use of any individual wire guards for the respective hooks.

It will be noted from the above description that I have provided a lure having a spoon element which when drawn through the water, will be positioned at an angle whereby light may be reflected from the bottom thereof and which will simulate the wiggling movement of a live bait. Likewise, the lure is so designed and constructed that it will be substantially weedless in use.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a fish lure, a spoon having a head and a tail portion, means on the head portion for attachment to a line, the tail portion being enlarged at the sides thereof to provide defined ears, the total width of said tail portion being greater than that of said head portion, a hook having its shank secured to the upper face of said spoon adjacent the longitudinal axis thereof, with the barb extending upwardly, the head portion of said spoon being substantially flat, said ears being substantially flat and extending upwardly at an angle to one another.

2. In a fish lure, a spoon having a head and a tail portion, means on the head portion for attachment to a line, the tail portion being enlarged at the sides thereof to provide defined ears, the total width of said tail portion being greater than that of said head portion, whereby the spoon travels through the water at a pronounced longitudinal angle, with the tail portion positioned below the head portion, and a hook secured to said spoon with the tang of the hook positioned below the attaching means on said head portion whereby said hook is shielded by said spoon as the latter travels through the water, the head portion of said spoon being substantially flat, said ears being substantially flat and extending upwardly at an angle to one another to impart a lateral movement to said tail portion.

3. In a fish lure, a spoon having a head and a tail portion, means on the head portion for attachment to a line, a hook, means for movably securing said hook to said tail portion, said spoon being so shaped that it will rotate through an arc of less than 180° about an axis passing substantially through the means on said spoon for attachment to the line and through a portion of said hook, said tail portion being spaced from said axis, said spoon being rotatable relative said attaching means and hook.

EARL W. SMITH.